Nov. 9, 1943.  H. H. BLOSJO  2,333,976
MEASURING APPARATUS
Filed Aug. 3, 1942  2 Sheets-Sheet 1

INVENTOR
HERBERT H. BLOSJO
By Paul, Paul & Moore
ATTORNEYS

Nov. 9, 1943.   H. H. BLOSJO   2,333,976
MEASURING APPARATUS
Filed Aug. 3, 1942   2 Sheets-Sheet 2
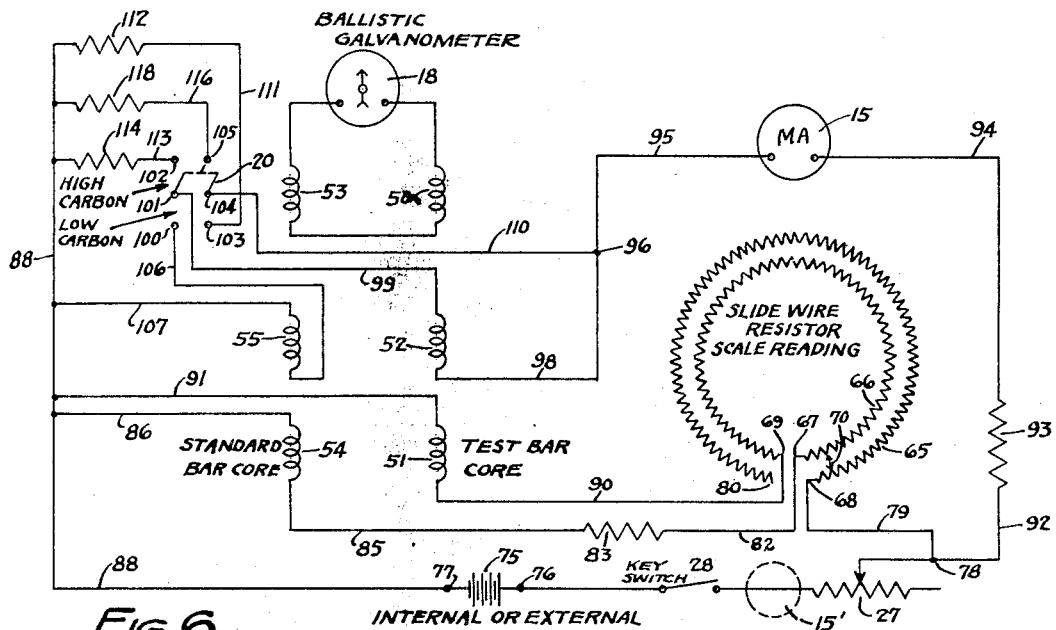
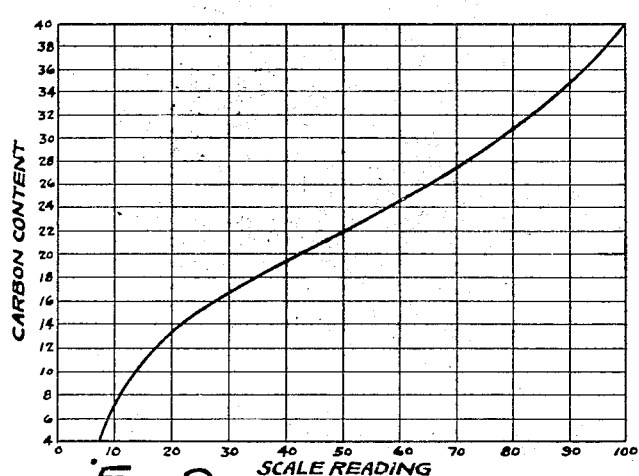
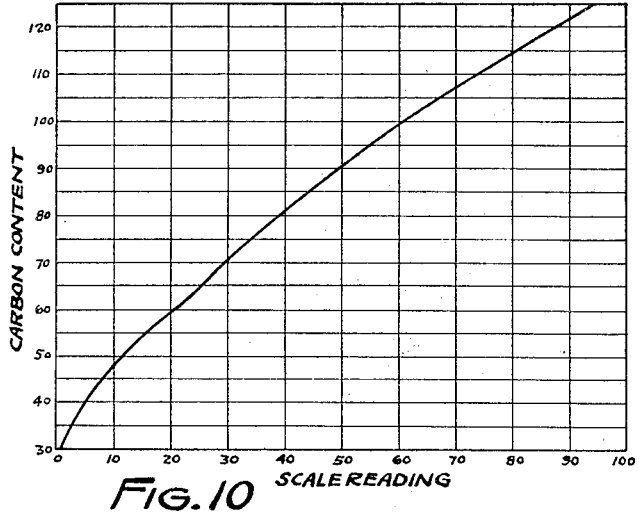
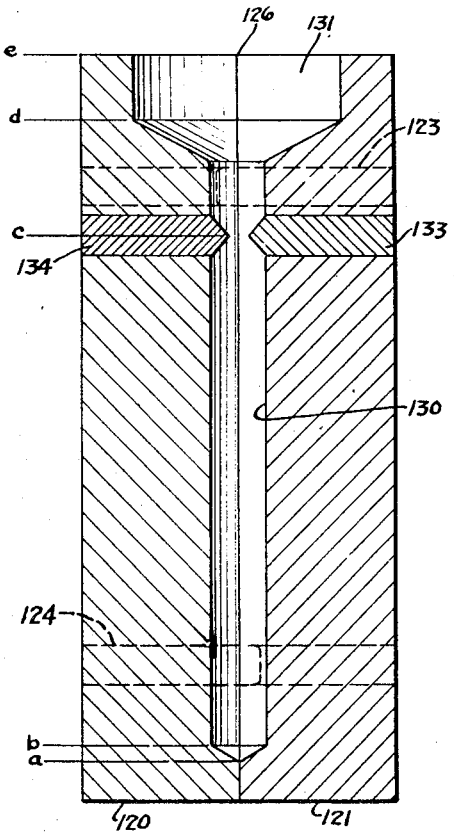
INVENTOR
HERBERT H. BLOSJO
By Paul, Paul & Moore
ATTORNEYS Patented Nov. 9, 1943

2,333,976

UNITED STATES PATENT OFFICE 2,333,976

MEASURING APPARATUS

Herbert H. Blosjo, Minneapolis, Minn.

Application August 3, 1942, Serial No. 453,370

9 Claims. (Cl. 175—183)

This invention relates to an improved apparatus for rapidly and accurately determining the carbon content of steel and iron by the magnetic permeability method. It has long been known that the magnetic permeability of steel and iron is influenced by the carbon content, and advantage has been taken of this characteristic to allow rapid, accurate estimating of the carbon content of steel during furnace operations while a heat is in process.

The apparatus herein described and illustrated provides an improved mode of accurately and rapidly measuring permeability (and hence carbon content of steel and iron), and it is an object of the invention to provide such an apparatus.

It is also an object of the invention to provide a rugged portable apparatus powered by available portable dry cell batteries, thereby dispensing with any need for an alternating current power supply source and to provide an apparatus wherein the measured quantity may be conveniently read as a set scale reading, and wherein it is unnecessary to read the maximum of a large amplitude, rapid, meter deflection, as has been necessary in certain prior permeability measuring instruments.

It is also an object to provide a permeability measuring instrument capable of being used with equal accuracy on low and high carbon steels.

Other and further objects are those inherent in and implied by the apparatus herein illustrated, described and claimed.

The invention is illustrated with reference to the drawings in which Figure 1 is a fragmentary plan view of the assembled instrument, showing the cover opened.

Figure 6 is a wiring diagram showing the various circuits of the apparatus.

Figures 7 and 8 are respectively an elevational view in section and a top plan view of a mold for casting the standard and test bars.

Figures 9 and 10 are graphs having carbon contents as ordinates and the meter reading of the instrument as abcissas for, respectively, low carbon content steel and high carbon content steel.

Figure 1:
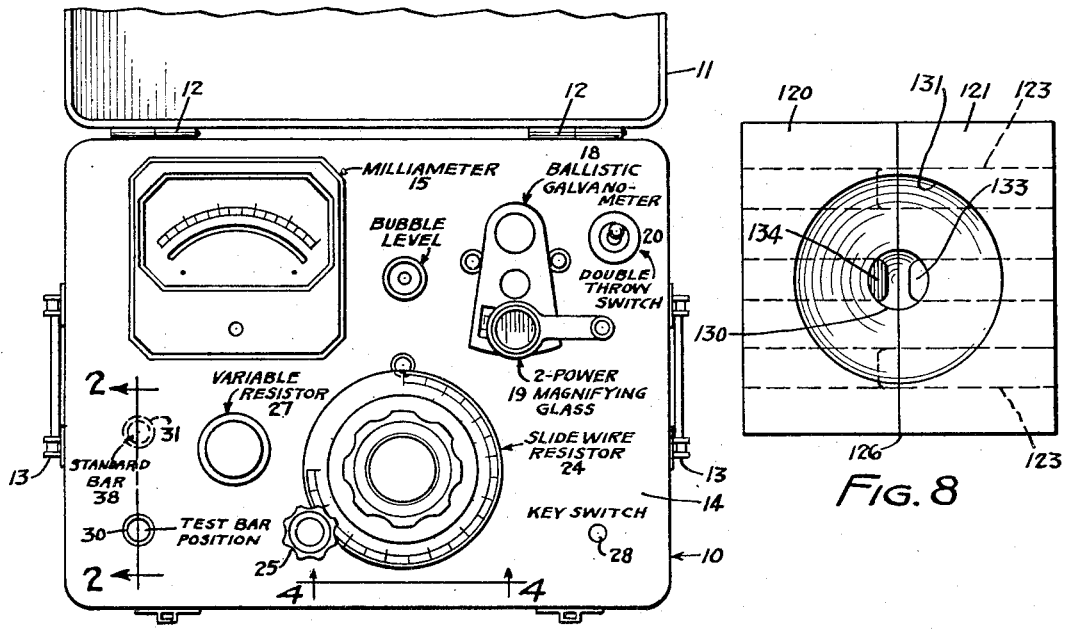

Referring to the drawings, Figure 1 illustrates a plan view of the complete, assembled apparatus. The apparatus is housed in a casing 10 which may be made of wood, aluminum, or any non-magnetic material. Molded plastics may be used for the case if desired. The casing 10 is provided with a hinged top cover 11 mounted on slip-pin hinges 12 so that the cover may be removed if desired, and at each side of the casing there are carrying handles 13—13.

Upon the panel 14 of the casing there are mounted a milliammeter 15, a ballistic galvanometer 18 having a magnifying reading glass 19, a double pole double throw toggle switch 20, a slide wire resistor control having a graduated dial and control knob 24, and a vernier control knob 25, a variable resistor control 27, and key switch 28. In addition, the panel 14 is provided with a tubular recess formed by the tube 30 for receiving a test bar of unknown material as presently will be described.

Certain components of the testing apparatus are illustrated in greater detail in Figures 2 thru 5.

Figure 3:
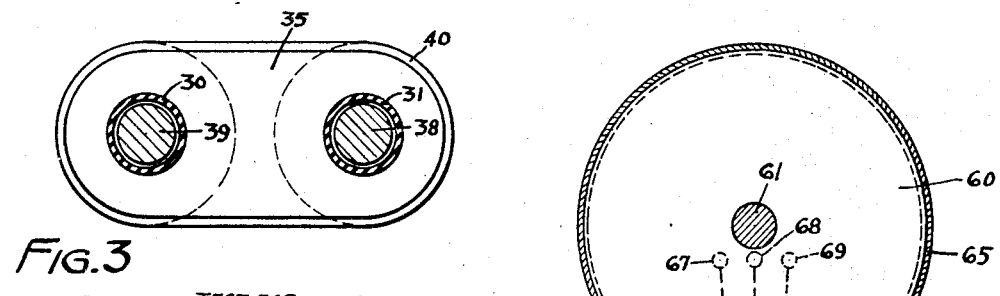
Figure 3 is a fragmentary sectional view taken along the line 3—3 of Figure 2.
Figures 2, 4, 5:
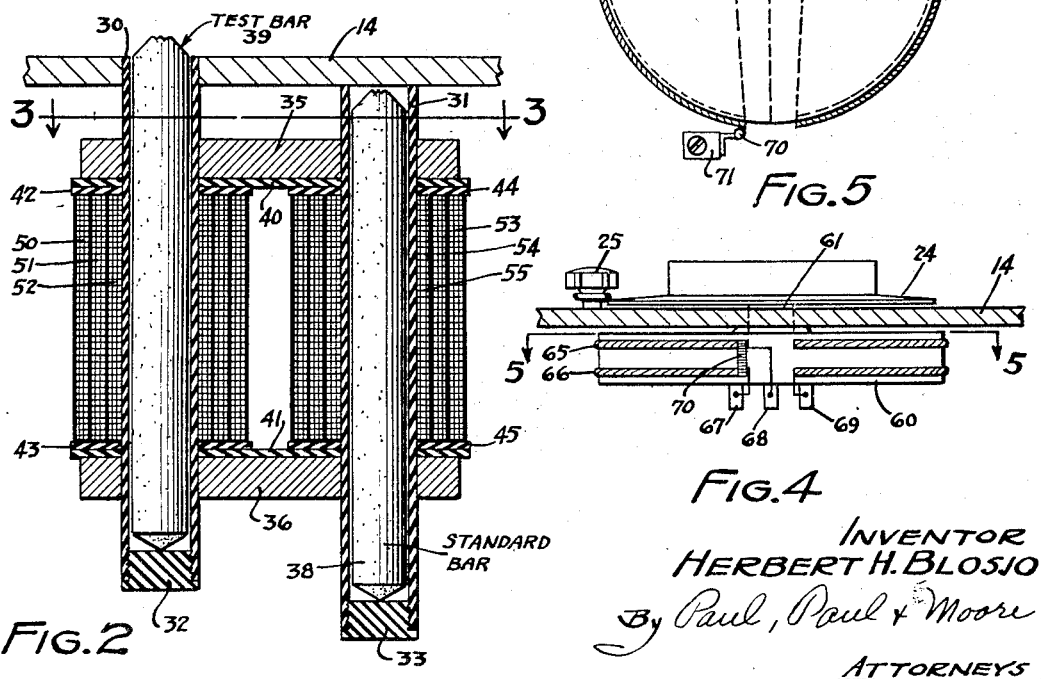
Figure 2 is an enlarged sectional view taken along line 2—2 of Figure 1.
Figure 4 is an enlarged fragmentary elevational view in section, taken along the line 4—4 of Figure 1.
Figure 5 is an enlarged fragmentary plan view partly in section, taken along the line 5—5 of Figure 4.

Figures 2 and 3 illustrate the construction and arrangement of the magnetic and inductive section of the apparatus, which is positioned below panel 14, within the casing 10, along line 2—2. This section of the apparatus comprises a pair of non-magnetic, electrically non-conductive tubes 30 and 31, preferably of identical length, mounted parallel to each other and slightly offset endwise. Tube 30 protrudes thru panel 14 and is supported thereby, whereas tube 31 abuts against the lower side of the panel and may be fastened ruggedly to the casing or panel, in any suitable manner. Both tubes 30 and 31 are plugged at their lower ends, as by screw plugs 32 and 33 of fiber.

Upon the tubes there are pressed two end pieces 35 and 36, which may be made of any suitable magnetic or non-magnetic material. Soft iron is preferable, but non-magnetic materials such as fiber may also be used. The magnetic arrangement also includes a standard bar 38 within tube 31, and an unknown or test bar 39 within tube 30. Bars 38 and 39 are preferably made substantially identical in configuration, being preferably cast in the same mold, as hereinafter explained. Bar 38 remains in the apparatus (once calibrated) whereas bar 39 is the test sample, the magnetic permeability of which is determined by the apparatus.

Against end pieces 35 and 36, which may be magnetic or non-magnetic, there are positioned fiber pieces 40 and 41; and against these there are placed fiber washers 42 and 43 (on tube 30) and 44 and 45 (on tube 31).

Tube 30 and washers 42 and 43 constitute a spool, and prior to assembly of end pieces 35 and 36 this spool may conveniently be used for the winding of the three coils 50, 51, and 52 thereon. Tube 31 and washers 44 and 45 also form a spool, and similarly support coils 53, 54 and 55. The terminals of coils 50—55 are not illustrated in Figures 2 and 3, but it will be understood that these are brought out in a convenient manner.

Figures 4 and 5 illustrate a double slide wire resistor element 24 of the apparatus, and consists of a thick disk 60 of fiber or other insulating material having a mounting shaft 61 extending thru panel 14. Upon shaft 61 there is positioned a knob and dial 24, calibrated as indicated in Figure 1, and a vernier 25 working against the dial 24 is provided and serves to allow minute rotary adjustments. The disk 60 is circumferentially grooved to receive two resistors 65 and 66 which are provided with terminals 67, 68 and 69 as illustrated. A stationary bridging contact 70 carried by stud 71 mounted on panel 14, serves to bridge the resistors 65 and 66.

The circuits of the apparatus are illustrated in Figure 6. It will be understood that coils 50, 51, and 52 are on tube 30, which receives the unknown or test bar 39; and that coils 53, 54, and 55 are on tube 31, which holds the standard bar 38.

Coils 51 and 52 are wound and connected so that the magnetomotive forces of the two are additive. Likewise, coils 54 and 55 are wound and connected so as to be additive. However, the magnetomotive force produced by coils 51 and 52 produces a magnetic polarity in bar 39, which may be alike or opposite to the magnetic polarity produced by coils 54 and 55, (or 54 alone), upon bar 38. That is to say, when the coils are energized adjacent ends of bars 38 and 39 may have the same or different polarity. In the preferred embodiment end pieces 35 and 36 are made of soft iron, and the primary coils 51 and 52 and also 54 and 55 are so connected as to provide like polarity in bars 39 and 38 respectively. When such is the case, the return flux path for each coil is thru the air adjacent the coil, except for any slight excess of flux in one bar as compared to the other bar. Under such conditions, also, bars 35 and 36 serve the useful purpose of providing pole faces for the return flux path of each coil.

The apparatus includes a battery 75 which is preferably an internal dry cell battery housed in the case 10, but may be an external direct current source connected to battery terminals 76 and 77.

Beginning at battery terminal 76, two primary circuits extend thru a quick make-and-break key switch 28 to variable resistor 27, to junction 78, whence they divide. The first primary circuit extends thru conductor 79 to terminal 68 of slide wire resistor 65. It will be noted that resistor 65 dead ends at 80. The circuit, however, continues from terminal 68, thru a portion of resistor 65, across bridging contact 70, whence it divides again on resistor 66. One section of the first primary circuit continuing via a portion of resistor 65, to terminal 67, conductor 82, thru resistor 83, line 85, to coil 54, lines 86 and 88, to battery terminal 77. From bridging contact 70 another section of the first primary circuit continues over the other part of the resistor 66, to terminal 69, thence over line 90 to coil 51, and then thru lines 91 and 88 to battery terminal 77.

A second primary circuit follows the same path as the first primary circuit to junction 78 (at resistor 27), and then continues via line 92, resistor 93, line 94, milliammeter 15, line 95 to junction 96. At junction point 96 the second primary circuit divides: one section continues by way of line 98, coil 52, line 99, to terminal 101 of the double pole switch 20. When switch 20 is in the lower (low carbon content) position this circuit continues from terminal 101 of switch 20 to terminal 100, then over line 106, coil 55, lines 107 and 88 to terminal 77 of the battery 75. When switch 20 is in the upper (high carbon content) position the circuit is continued from terminal 101 to terminal 102 and then by way of line 113, resistor 114, and line 88 to the battery terminal 77. Referring again to junction 96 of the second primary circuit, a second section thereof continues by way of line 110 directly to terminal 104 of switch 20. When the switch 20 is in the lower (low carbon content) position, the circuit continues from terminal 103, thru line 111, resistor 112, and line 88 to battery terminal 77; whereas when switch 20 is in the upper (high carbon content) position, the circuit continues from terminal 105, thru line 116, resistor 118, and line 88 to battery terminal 77.

It will thus be observed that when key 28 is depressed circuits are established thru coils 51 and 54, the magnitude of the electrical currents therethru being regulated firstly by variable resistor 27 and secondly by the setting of slide wire resistor control 24 which serves to vary the position of the bridging contact 70 in the resistor elements 65 and 66. Key 28 also controls the current from junction 78 thru resistor 93, milliammeter 15, and thence thru both sections of the second primary circuit, viz., coils 52 and 55 in series or coil 52 alone. The resistors 114, 118, and 112 serve as ballast to maintain the current thru milliammeter 15 in approximately the same range regardless of whether coils 52 and 55 are both energized (as occurs when the switch 20 is in the low carbon portion) or only coil 52 is energized (as occurs when switch 20 is in the high carbon position). Resistors 114, 118, 112 are preferably of the adjustable "fixed" type, and remain constant after an initial regulation.

The secondary circuit comprises coils 50 and 53 connected in series and in series with a ballistic galvanometer 18. Secondary coils 50 and 53 are connected in opposition regardless of the mode of connection of the primaries, that is to say, so that a collapse flux in bars 38 and 39 will produce opposed voltages in the secondary coils so that only the resultant differential voltage is applied to galvanometer 18. Thus, when the total magnetic flux in the standard bar 38 is equal to that of the unknown test bar 39 and has the same instantaneous rate of collapse of flux, the galvanometer 18 does not deflect when the primary circuit is made or broken.

It may be pointed out that bars 38 and 39 need not be the same dimensions, for compensatory alteration of the size and number of turns of the primary and secondary coils will enable the generation of like voltages in the two secondaries 50 and 53. However, for convenience in design and maintenance, it is desirable to cast the standard bar 38 in the same mold as is used for casting the test bars 39, and to use identical coil assemblies for each bar.

The relationship between magnetic permeability and carbon content of a ferrous metal is influenced to some degree by variation in dimensions, surface, and internal irregularities, cold working of the metal, heat treatment, and the percentage of alloying metals present, e. g., chromium, molybdenum, silicon, manganese, nickel, etc.

In order that some, at least, of these factors may be minimized, the standard and test bars are cast under conditions as nearly identical as possible in a mold such as that illustrated in Figures 7 and 8. The mold is of steel, and consists of two identical halves, 120 and 121, arranged to be placed together and held assembled by locating pins 123 and 124 and a C-clamp, not illustrated. When assembled, the mold has a square cross-section, as illustrated in Figure 8, the halves being separable along line 126. The mold cavity has a slender, cylindrical portion 130 and an enlarged funnel end 131. Each of the halves, 120 and 121, is provided with a fitted-in pin 133 and 134, which projects into the cylindrical bore 130 near its upper extremity, these pins being bevelled off at their upper ends so as to form a weakened portion in the cast bar, thus allowing the upper (pipe) end of the casting to be easily broken off by bending.

To insure uniformity of results, the bars are cast as follows:

The molten metal is removed from the furnace in a well slagged spoon, the average quantity of metal removed being about two pounds. The fluid slag on top of the metal is skimmed off, and the metal allowed to cool somewhat, at which time aluminum is added by throwing a portion of 1/8 inch aluminum wire into the spoon and stirring slightly to mix aluminum with the metal. The mold then is poured and requires about a 1/2 pound of metal. The most uniform bars are obtained by pouring with a slow but steady stream from the spoon. If the pouring cap is choked, the air has to bubble up thru the metal and a fairly rough bar usually results.

A stop watch is started as soon as the mold fills, and the mold is left untouched until 60 seconds after pouring. It is then broken up and the bar quenched in water. In ten seconds the bar is cold and is removed from the water, and the top or "pipe" end of the bar clamped in a vise. The bar is broken off by slipping a piece of 1/2 inch diameter pipe about 15 inches long over the bar and bending back and forth until the bar breaks off at the reduced section. The bar is wiped fairly dry, and then is ready for the instrument.

When initially calibrating the instrument, two bars are poured out of each heat so that one may be used in the instrument for determining magnetic permeability and the other used in the chemical laboratory for carbon analysis by usual combustion methods. After a calibration curve has been prepared, the carbon content may be determined quickly (2-2½ minutes) by the permeability method herein illustrated.

Specific instrument

Without limiting the broader aspects of the invention, the following specifications are cited as illustrative of a workable permability measuring instrument.

*Battery 75.*—Four cell, six volt, dry battery of the "hot shot" type. When this is used the battery is not self-contained, but is connected to battery terminals 76 and 77.

*Key switch 28.*—This switch should be of an instantaneous make and break type, and the contacts should be of such material as not appreciably to change resistance in use. Contacts comprised of 80% platinum and 20% iridium are very satisfactory for carrying the current of approximately 0.2 ampere.

*Resistor 27.*—10 ohm variable resistor of the type customarily used in radio apparatus.

*Resistor 83.*—60 ohm, 2 watt radio type fixed resistor.

*Resistor 65.*—10 ohm, resistance mounted on disk 60.

*Resistor 66.*—60 ohm resistance mounted on disk 60.

*Resistor 93.*—40 ohm, 2 watt radio type fixed resistor.

*Milliammeter 15.*—Any direct current milliammeter of good make having a 0-75 milliampere range and scale length of 2½ to 3 inches. Absolute accuracy is not essential so long as the instrument is not sluggish. Accuracy of 2% is satisfactory.

*Galvanometer 18.*—Any ballistic galvanometer of good construction having a sensitivity of about five microamperes per division and a scale length of 10-15 divisions.

*Resistor 118.*—55 ohm, 2 watt, radio type fixed resistor.

*Resistor 114.*—250 ohm, 1 watt radio type fixed resistor.

*Resistor 112.*—700 ohm, 1 watt radio type fixed resistor.

*Switch 20.*—Double throw, double pole, toggle switch.

*End pieces 35 and 36.*—Soft iron or mild steel, 3/8 inch thick by 1½ inch wide, rounded at the end to 3/4 inch radius.

*Coils 50 thru 55.*—The spool formed by tube 30 and washers 42 and 43 has a diameter (outer diameter of tube 30) of about $\tfrac{14}{16}$ inch and a winding space between washers 42 and 43 of 2½ inches. The spool formed by tube 31 and washers 44 and 45 has the same diameter and winding space. Coils 55 and 54 and 53 are wound on tube 31 in the order given. Coils 52, 51 and 50 are similarly wound on tube 30 in the order given. Coils 50 thru 55 are all wound of enamelled magnet wire, the gauges and number of turns being as follows:

Coils 52 and 55—28 gauge; 1650 turns
Coils 51 and 54—34 gauge; 1300 turns
Coils 50 and 53—30 gauge; 1000 turns Coils 51 and 52 are connected so as to produce magnetomotive forces in the same direction. Coils 54 and 55 are likewise connected, so as to produce magnetomotive forces in the same direction. Coils 51—52 and 54—55 are connected to produce the same magnetic polarity in adjacent (top or bottom) ends of bars 38 and 39.

In the foregoing, whenever a radio type fixed resistor is specified it is preferably a type which permits some adjustment for tuning the instrument after assembly. However, once adjusted, resistors 83, 93, 112, 114, and 118 do not require change during operation.

*Bar mold.*—Diameter of section 130 is 35/64 inch, dimension $a$ to $b$ is 3/32 inch; dimension $b$ to $c$ is 4 3/32 inches; dimension $c$ to $d$ is 11/32 inch, and dimension $d$ to $e$ is 1 inch.

It is, of course, to be understood that these precise dimensions and specifications for the instrument and bar mold may be varied without departing from the spirit of the invention illustrated, described and claimed, these precise specifications and dimensions being given merely by way of illustration so as to facilitate practicing the invention without the need for mechanical and electrical skill of the degree usually and customarily required in putting patented inventions into practice.

*Operation.*—For putting the instrument into service it is preferable for the user to carry out a complete range of heats from lowest carbon content to the highest carbon content encountered in the particular shop in which the instrument is used. This will enable the user to gain familiarity with the use of the instrument, the rate of decrease of carbon content during a heat in the particular furnaces used, and will enable the user to check the effect of various alloying metals upon magnetic permeability.

In each heat two or more bars are cast, as described above, one bar being used in the instrument herein described for measurement of permeability, the reading of the instrument being merely a scale reading on variable resistor control 24. Other bars poured from the same ladle at the same time are for usual chemical analysis for percentage of carbon, principally, and for percentages of alloying metals where these are known to be present.

The standard bar 38 has a known carbon content, preferably relatively low carbon. For example, for the range presented by the graphs Figures 9 and 10, viz., 0.04% to 0.40% carbon of Figure 9, and 0.30% to 1.40% carbon of Figure 10, the standard bar used has a carbon content of about 0.12%.

In making a permeability comparison between the selected standard bar 38 and any of the unknown bars of the aforesaid calibration series, the test bar is placed in tube 30 with the conical end down. It may be noted at this juncture that both the standard bar 38 and the test bar 39 extend well beyond the end plates 35 and 36, and hence any irregularities due to breaking of the bar (cold working) are minimized, this being particularly true where plates 35 and 36 are of soft iron.

The key 28 is then depressed to establish contact, and by adjusting resistor 27, the current thru milliammeter 15 is brought to a value which is later to remain constant thruout the series of tests. For the specific instrument, the test bar size and carbon content range illustrated by the graphs Figures 9 and 10, the current thru milliammeter 15 is brought to 60 milliamperes. This builds up the magnetic flux in the bars 38 and 39. Satisfactory results are obtained when the flux density is less than 25% of saturation, altho different flux density may be used if desired.

The key 28 contact is made and broken about 15 times over a period of 2–3 seconds. Experience has shown that such repeated energization serves to stabilize the residual magnetism at the maximum for the bars in the machine. The key 28 is then made and broken several more times while observing galvanometer 18 and while so doing the slide wire rheostat control 24 is adjusted so as to reduce the magnitude of the deflecting galvanometer 18. If the induced voltages in coils 50 and 53 are not equal, or if equal but do not occur at the same time, the galvanometer will deflect. The induced voltage is affected by the magnetic permeability of the bars being compared, and the magnetic permeability is, in turn, related to the carbon content of the bars. Due to the fact that the rate of collapse of this flux may not be identical in both bars, it is impractical in all cases to attempt to adjust the instrument to achieve zero deflection of the galvanometer. Thus with a slightly different rate of collapse of magnetic flux in two bars the galvanometer may show a small rapid deflection in one direction and then a rapid deflection back to zero. This is confusing and for that reason in using the instrument, the control 24 is adjusted so that a slightly higher voltage is induced in one secondary coil as compared with the other secondary coil. Thus in making any permeability determination the slide wire resistor control 24 is adjusted until there is obtained a predetermined small deflection, say two galvanometer scale units, viz., 10 microamperes. When this adjustment is made the scale reading on the slide wire control 24 is read.

In making the calibration curves such as Figures 9 and 10 one bar taken from a heat is measured in the instrument and the scale reading of resistor control 24 is noted. Another bar from the same ladle is chemically analyzed by usual methods. Then the carbon content and slide wire resistor scale reading for that determination is plotted as one point on the curve. (Figures 9 and 10.) When a sufficient number of runs covering the desired range of carbon contents has been made and plotted, the curve is drawn in. Thereafter, the carbon content may be determined rapidly merely by making a permeability determination (scale reading on slide wire resistor control 24) and from the curves the corresponding carbon content can be determined accurately. Determination of carbon content by this permeability method can be achieved in from 2 to 2½ minutes.

For low carbon content steels, the switch 20 is moved to the lower position (bridging contacts 100 and 101 and bridging contacts 103 and 104). This serves to allow energization of coils 52 and 55 in series as the key switch 21 is made and broken. For high carbon content steels the switch 20 is moved to the upper position (bridging contacts 101 and 102 and contacts 104 and 105), in which condition coil 52 is serially connected with resistor 114 and coil 55 is out of the circuit and is hence deenergized. This affords a higher magnetomotive force to the high carbon content test bar as compared with the standard (which has a lower carbon content) thus compensating for the lower magnetic permeability of the higher carbon content test bar. The permeability difference of the two bars is thus compensated.

Resistors 118 and 112 are ballast, affording an additive current for each of the positions of switch 20 so that the current thru milliammeter 15 is nearly constant regardless of whether a low or high carbon content steel is being tested. This relieves the operator of the necessity of remembering the desired current for the two carbon content ranges of steel, since the meter 15 is merely set at the same reading regardless of the type of steel. It may be noted in passing that the milliammeter 15 while measuring the current in line 94, generally indicates the constancy of operating conditions thruout the first as well as the second primary circuits. The milliammeter 15 may, optionally, be located in the key switch circuit as indicated by the dotted line position 15'.

Many obvious variations will be apparent to those skilled in the art, and are considered as within the purview of the invention herein illustrated, described and claimed.

What I claim is:

1. An apparatus for rapidly determining the magnetic permeability of metallic ferrous compositions comprising a standard bar of magnetic material, a secondary circuit comprising spacially separated secondary coils, one coil being positioned so as to encircle the standard bar and the other positioned so as to encircle an unknown bar when the latter is in place for testing, said secondary coils being serially connected in opposition and in series with a ballistic galvanometer, a first primary coil encircling the standard bar and a second primary coil positioned so as to encircle said unknown bar when the latter is in place for testing, said first and second primary coils being connected in parallel, a quick break switch for simultaneously establishing and interrupting application of a direct current potential to said primary coils, and manually variable resistor means in the circuits of said primary coils for simultaneously increasing current flow thru one primary coil and decreasing current flow thru the other primary coil.

2. A direct current apparatus for rapidly determining the magnetic permeability of metallic ferrous compositions comprising a standard bar of magnetic material, a secondary circuit comprising spacially separated secondary coils, one coil being positioned so as to encircle the standard bar and the other positioned so as to encircle an unknown bar when the latter is in place for testing, said secondary coils being serially connected in opposition and in series with a ballistic galvanometer, a first primary coil encircling the standard bar and a second primary coil positioned so as to encircle said unknown bar when the latter is in place for testing, said first and second primary coils being connected in parallel, a quick break switch for simultaneously establishing and interrupting application of a direct current potential to said primary coils, and manually variable resistor means in the circuit of a primary coil for varying the current therethru, for varying the current therein sufficiently so as substantially to render equal the flux in the standard bar and unknown bar when the latter is in place for testing.

3. An apparatus of the type set forth in claim 1 further characterized in that provision is made for holding the standard bar and unknown bar comprising a pair of non-magnetic electrically non-conductive tubular supports held in parallel spaced relationship by a pair of parallel end bars of iron, said tubular supports having an internal dimension to receive the standard bar and unknown bar, said bars being sufficiently long to extend at each end beyond said end bars.

4. An apparatus of the type set forth in claim 1 further characterized by including a manually adjustable variable resistor in series with both primary coils and an ammeter in series with said manually adjustable variable resistor for gauging the current flowing thru said primary coils.

5. An apparatus for rapidly determining the magnetic permeability of metallic ferrous compositions comprising a magnetic circuit composed of a standard bar of magnetic material, magnetically permeable connections of ferrous material on the ends of said standard bar, means attached to said permeable connections for supporting an unknown bar of dimensions substantially like those of the standard bar, a secondary circuit comprising substantially identical secondary coils, one coil being positioned so as to encircle the standard bar and the other positioned so as to encircle the unknown bar when the latter is in place for testing, said secondary coils being serially connected in opposition and in series with a ballistic galvanometer, a first primary coil encircling the standard bar and a second primary coil positioned so as to encircle the unknown bar when the latter is in place for testing, said first and second coils being connected in parallel, a quick break switch for simultaneously establishing and interrupting application of a direct current potential to said primary coils, manually variable resistor means in the circuits of said coils for simultaneously increasing current flow to one primary coil and decreasing current flow to the other primary coil.

6. An apparatus for rapidly determining the magnetic permeability of metallic ferrous compositions comprising a magnetic circuit composed of a standard bar of magnetic material, magnetically permeable connections of ferrous material on the ends of said standard bar, means attached to said connections for supporting an unknown bar of dimensions substantially like those of the standard bar, a secondary circuit comprising substantially identical secondary coils, one coil being positioned so as to encircle the standard bar and the other positioned so as to encircle the unknown bar when the latter is in place for testing, said secondary coils being serially connected in opposition and in series with a ballistic galvanometer, a first primary coil encircling the standard bar, and a second primary coil positioned so as to encircle the unknown bar when the latter is in place for testing, said first and second coils being connected in parallel, a quick break switch for simultaneously establishing and interrupting application of a direct current potential to said primary coils, manually variable resistor means in the circuits of said coils for simultaneously increasing current flow to one primary coil and decreasing current flow to the other primary coil, a third primary coil positioned so as to encircle one of bars and manually controlled means for varying application of direct current thereto.

7. An apparatus for rapidly determining the magnetic permeability of metallic ferrous compositions comprising a magnetic circuit composed of a standard bar of magnetic material, magnetically permeable connections of ferrous material on the ends of said standard bar, means attached to said permeable connections for supporting an unknown bar of dimensions substantially like those of the standard bar, a secondary circuit comprising substantially identical secondary coils, one coil being positioned so as to encircle the standard bar and the other positioned so as to encircle the unknown bar when the latter is in place for testing, said secondary coils being serially connected in opposition and in series with a ballistic galvanometer, a first primary coil encircling the standard bar and a second primary coil positioned so as to encircle the unknown bar when the latter is in place for testing, said first and second coils being connected in parallel, a quick break switch for simultaneously establishing and interrupting application of a direct current potential to said primary coils, manually variable resistor means in the circuits of said coils for simultaneously increasing current flow to one primary coil and decreasing current flow in the other primary coil, a third primary coil positioned so as to encircle said standard bar, and a fourth primary coil positioned so as to encircle said unknown bar when the latter is in place for testing, and manually controlled switch means for applying a direct current potential to said third and fourth coils or to said fourth coil only.

8. An apparatus for rapidly determining the magnetic permeability of metallic ferrous compositions comprising a magnetic circuit composed of a standard bar of magnetic material, magnetically permeable connections of ferrous material on the ends of said standard bar, means attached to said connections for supporting an unknown bar of dimensions substantially like those of the standard bar, a secondary circuit comprising substantially identical secondary coils, one coil being positioned so as to encircle the standard bar and the other positioned so as to encircle the unknown bar when the latter is in place for testing, said secondary coils being serially connected in opposition and in series with a ballistic galvanometer, a first and second primary coils, one around the standard bar and the other around the unknown bar, said coils being connected in parallel with each other, a direct current source of potential for energizing said primary coils, a manually controlled resistor means for varying the current thru both of said coils, and second manually controlled resistor means for variably proportioning the current between said coils.

9. An apparatus for rapidly determining the magnetic permeability of metallic ferrous compositions comprising a magnetic circuit composed of a standard bar of magnetic material, magnetically permeable connections of ferrous material on the ends of said standard bar, means attached to said permeable connections for supporting an unknown bar of dimensions substantially like those of the standard bar, a secondary circuit comprising substantially identical secondary coils, one coil being positioned so as to encircle the standard bar, and the other positioned so as to encircle the unknown bar when the latter is in place for testing, said secondary coils being serially connected in opposition and in series with a ballistic galvanometer, a first, second, third, and fourth primary coils, the first and third coils being positioned so as to encircle the standard bar, and the second and fourth coils being positioned so as to encircle the unknown bar when the latter is in place to be tested, said first and second coils being connected in parallel for energization, manually controllable switch means for connecting the third and fourth coils in series for energization or for connecting said fourth coil for energization while the third coil remains de-energized, and resistor means under control of said switch means connected in parallel with said fourth coil.

HERBERT H. BLOSJO.